United States Patent
Wang et al.

(10) Patent No.: US 11,845,831 B2
(45) Date of Patent: Dec. 19, 2023

(54) HIGH-MOLECULAR WEIGHT ALLYL ALCOHOL POLYOXYETHYLENE POLYOXYPROPYLENE ETHER AND PREPARATION METHOD

(71) Applicants: Zhejiang Huangma Technology Co., Ltd., Zhejiang (CN); Zhejiang Huangma Shangyi New Material Co., Ltd., Zhejiang (CN); Zhejiang Lukean Chemical Co., Ltd., Zhejiang (CN); Shangyu Huangma Surface Activated Reagent Research Institute Co., Ltd., Zhejiang (CN)

(72) Inventors: Weisong Wang, Zhejiang (CN); Yifeng Jin, Zhejiang (CN); Majishi Wang, Zhejiang (CN); Dinglian Ma, Zhejiang (CN); Ran Kou, Zhejiang (CN); Hongjun Gao, Zhejiang (CN); Qingmei Wan, Zhejiang (CN)

(73) Assignees: Zhejiang Huangma Technology Co., Ltd., Shaoxing (CN); Zhejiang Huangma Shangyi New Material Co., Ltd., Shaoxing (CN); Zhejiang Lukean Chemical Co., Ltd., Shaoxing (CN); Shangyu Huangma Surface Activated Reagent Research Institute Co., Ltd., Shaoxing (CN)

( * ) Notice: Subject to any disclaimer, the term of this patent is extended or adjusted under 35 U.S.C. 154(b) by 0 days.

(21) Appl. No.: 18/075,424

(22) Filed: Dec. 6, 2022

(65) Prior Publication Data
US 2023/0303768 A1    Sep. 28, 2023

(30) Foreign Application Priority Data

Mar. 28, 2022 (CN) .......................... 202210310861.4

(51) Int. Cl.
*C08G 65/26* (2006.01)

(52) U.S. Cl.
CPC ..... *C08G 65/2609* (2013.01); *C08G 65/2648* (2013.01); *C08G 65/2693* (2013.01); *C08G 65/2696* (2013.01)

(58) Field of Classification Search
CPC ............ C08G 65/2609; C08G 65/2648; C08G 65/2693; C08G 65/2696
See application file for complete search history.

(56) References Cited

U.S. PATENT DOCUMENTS 7,935,734 B2 *   5/2011   Tonkovich ................ C10L 1/08
                                                      518/700

FOREIGN PATENT DOCUMENTS

| CN | 103665367 A | 3/2014 |
| CN | 102911352 B | 11/2014 |

* cited by examiner

Primary Examiner — Rabon A Sergent

(57) ABSTRACT

Related are a high-molecular weight allyl alcohol polyoxyethylene polyoxypropylene ether and a preparation method. During preparation, an allyl alcohol raw material and a supported catalyst Rb-NHPA are firstly added into a high-pressure reaction kettle, and it is heated after being replaced with a nitrogen gas; then after the internal temperature of the reaction kettle is raised to a reaction temperature, an ethylene oxide (EO) and propylene oxide (PO) mixture is continuously fed for a reaction; and finally, after the internal temperature of the reaction kettle is reduced, an acetic acid is dropwise added into the reaction kettle so that the crude product of the high-molecular weight allyl alcohol polyoxyethylene polyoxypropylene ether is neutralized to be neutral. The refining process of a polyether is omitted, the process flow is greatly simplified, and the process time is effectively saved. In addition, the supported catalyst Rb-NHP may be recycled.

10 Claims, 1 Drawing Sheet

HIGH-MOLECULAR WEIGHT ALLYL ALCOHOL POLYOXYETHYLENE POLYOXYPROPYLENE ETHER AND PREPARATION METHOD

CROSS-REFERENCE TO RELATED APPLICATION

The present application claims priority from Chinese Patent Application No. 202210310861.4 filed on Mar. 28, 2022, the contents of which are incorporated herein by reference in their entirety.

TECHNICAL FIELD

The present invention belongs to the technical field of organic high-molecular compounds, in particular to a high-molecular weight allyl alcohol polyoxyethylene polyoxypropylene ether and a preparation method.

BACKGROUND

An allyl alcohol polyoxyethylene polyoxypropylene ether is an unsaturated polyether of which one end is an allyl group and the other end is a hydroxyl group, and its double bond may be used to react with various active groups so as to introduce the special properties such as the lubricating effect, softening effect, demulsibility and defoaming property provided by a polyether chain segment into various new-type multi-functional fine chemical products.

However, it is found by the applicant that: a two-step method is often used in the existing industry to prepare an allyl alcohol polyoxyethylene polyoxypropylene random polyether. Namely, Na, K or its hydroxides or a sodium methoxide, a potassium methoxide or the like is used as a catalyst, a low-molecular weight allyl alcohol random polyether 400-1500 is firstly synthesized, then the low-molecular weight random polyether is used as a starting agent, and a mixture of an ethylene oxide and a propylene oxide is used as a chain extender, to synthesize the high-molecular weight allyl alcohol random polyether. A prepared crude product of the allyl alcohol random polyether needs to remove residual alkali metal ions in the product by a complicated post-treatment process so that a reaction of a subsequent product is not affected, and in the post-treatment process, deionized water needs to be added to dissociate the alkali metals, a phosphoric acid is added for neutralization, an adsorbent such as a silicate is used for adsorption, and after co-heated dehydration, it is filtered to remove the alkali metal ions and acid radical ions in the product. A patent CN102911352B prepares the allyl alcohol random polyether by refining according to this method, and its disadvantage is that while the molecular weight of the allyl alcohol random polyether is increased to a certain amount (>3000), the product filtering speed is extremely slow, so that the production cycle becomes longer, the profit is reduced, and a large number of adsorbent waste residues may be generated after filtering, these waste adsorbents are bound to cause the resource waste and produce the secondary pollution.

SUMMARY

In order to overcome deficiencies of an existing technology, a purpose of the present invention is to provide a preparation method for a high-molecular weight allyl alcohol polyoxyethylene polyoxypropylene ether which may omit the refining process of a polyether, greatly simplify the process flow, and effectively save the process time, and the high-molecular weight allyl alcohol polyoxyethylene polyoxypropylene ether prepared by this method.

In order to solve the above problems, technical schemes adopted by the present invention are as follows.

The present invention provides a preparation method for a high-molecular weight allyl alcohol polyoxyethylene polyoxypropylene ether, including:

S1, adding an allyl alcohol raw material and a supported catalyst Rb-NHPA into a high-pressure reaction kettle, and heating after the interior of the reaction kettle is replaced with a nitrogen gas;

S2, after the internal temperature of the reaction kettle is raised to a reaction temperature, continuously feeding an ethylene oxide (EO) and propylene oxide (PO) mixture for a reaction, and after the mixture is added, maturing until the internal pressure of the reaction kettle is no longer decreased, stopping the reaction, and removing a low-boiling point substance in vacuum, to obtain a crude product of the high-molecular weight allyl alcohol polyoxyethylene polyoxypropylene ether; and S3, after the internal temperature of the reaction kettle is reduced, dropwise adding an acetic acid into the reaction kettle so that the crude product of the high-molecular weight allyl alcohol polyoxyethylene polyoxypropylene ether is neutralized to be neutral, stirring, and filtering, to obtain the high-molecular weight allyl alcohol polyoxyethylene polyoxypropylene ether.

Further, the reaction mechanism of the preparation method is as follows.

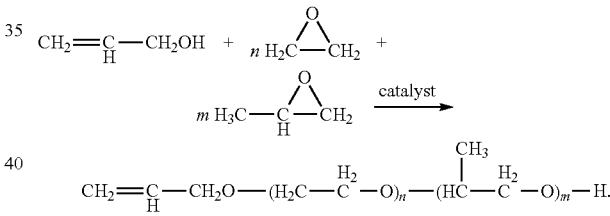

Further, the supported catalyst Rb-NHPA in the step S1 is prepared by the following steps.

S1-1, hydrothermal pore expansion pretreatment of support: putting a nano-hydroxyapatite (NHPA) support into the reaction kettle, adding deionized water, and performing water vapor pore expansion treatment of the NHPA support under a condition of gas protection, and after vacuum-drying and removing the water, roasting, cooling, and vacuumizing.

S1-2, equivalent-volume impregnation: dissolving the NHPA support after the hydrothermal pore expansion pretreatment in anhydrous ethanol, adding rubidium hydroxide solution and stirring intensely, so that the NHPA support is fully contacted with an active component, then filtering after intermittent ultrasonic assisted impregnation, vacuum-drying, to form a porous honeycomb solid, and roasting, to obtain the supported catalyst Rb-NHPA.

Further, the mass ratio of the NHPA support to the deionized water is 0.5~2:3.

Further, the mass ratio of the rubidium hydroxide solution to the anhydrous ethanol is 0.5~5:10.

Further, in the step S1-1, operations of "performing the water vapor pore expansion treatment of the NHPA support under the condition of gas protection, and after vacuum-drying and removing the water, roasting, cooling, and vacuumizing" are specifically as follows: under the conditions of 120° C. of the temperature, 1.2 Mpa of the pressure, and using $N_2$ as a protective gas, after performing the water vapor pore expansion treatment on the NHPA support for 2 h, putting it into a 110° C. vacuum drying oven and drying for 6 h, to remove the water, then roasting in a 600° C. muffle furnace for 4 h, and vacuumizing for 30 min after cooling to a room temperature.

Further, in the step S1-2, after the rubidium hydroxide solution is added, it is intensely stirred for 6~8 hours at 60° C.~80° C., and the intermittent ultrasonic assisted impregnation is performed for two times, and after being filtered, it is put into a 120° C. vacuum drying oven and dried for 12 h, after the porous honeycomb solid is formed, it is roasted for 3 h at 600° C.

Further, the amount of the supported catalyst Rb-NHPA in the S1 is 0.05%~0.5% of the mass of the high-molecular weight allyl alcohol polyoxyethylene polyoxypropylene ether obtained finally.

Further, the molecular weight of the obtained crude product of the high-molecular weight allyl alcohol polyoxyethylene polyoxypropylene ether is 3000-8000, and the weight ratio of EO to PO in the S2 is 1:0.5~5.

Further, the reaction temperature of the step S2 may be 80° C.~150° C., and the reaction pressure thereof is −0.09~0.40 Mpa; and in the step S3, the internal temperature of the reaction kettle is reduced to 50° C., and the stirring time is 30~60 minutes.

The present invention further provides a high-molecular weight allyl alcohol polyoxyethylene polyoxypropylene ether, and it is prepared by the above preparation method for the high-molecular weight allyl alcohol polyoxyethylene polyoxypropylene ether.

Compared with the existing technology, the beneficial effects of the present invention are as follows.

The present invention adopts the supported catalyst Rb-NHPA with high activity, so that the reaction is more complete and more sufficient. Under the condition of the same molecular weight, the double bond retention rate is high, the distribution coefficient is small, the reaction time is shorter, and the by-product content is low, so the refining process of the polyether is omitted, and the process time is greatly saved. In addition, the supported catalyst Rb-NHPA may be recycled, reused, and environment-friendly, and the cost may also be reduced.

DETAILED DESCRIPTION OF THE EMBODIMENTS

In order to make purposes, technical schemes and advantages of the present invention more clear, the present invention is further described in detail below in combination with drawings and embodiments. It should be understood that the specific embodiments described herein are only used to explain the present invention, not to limit the present invention.

Figure 1:
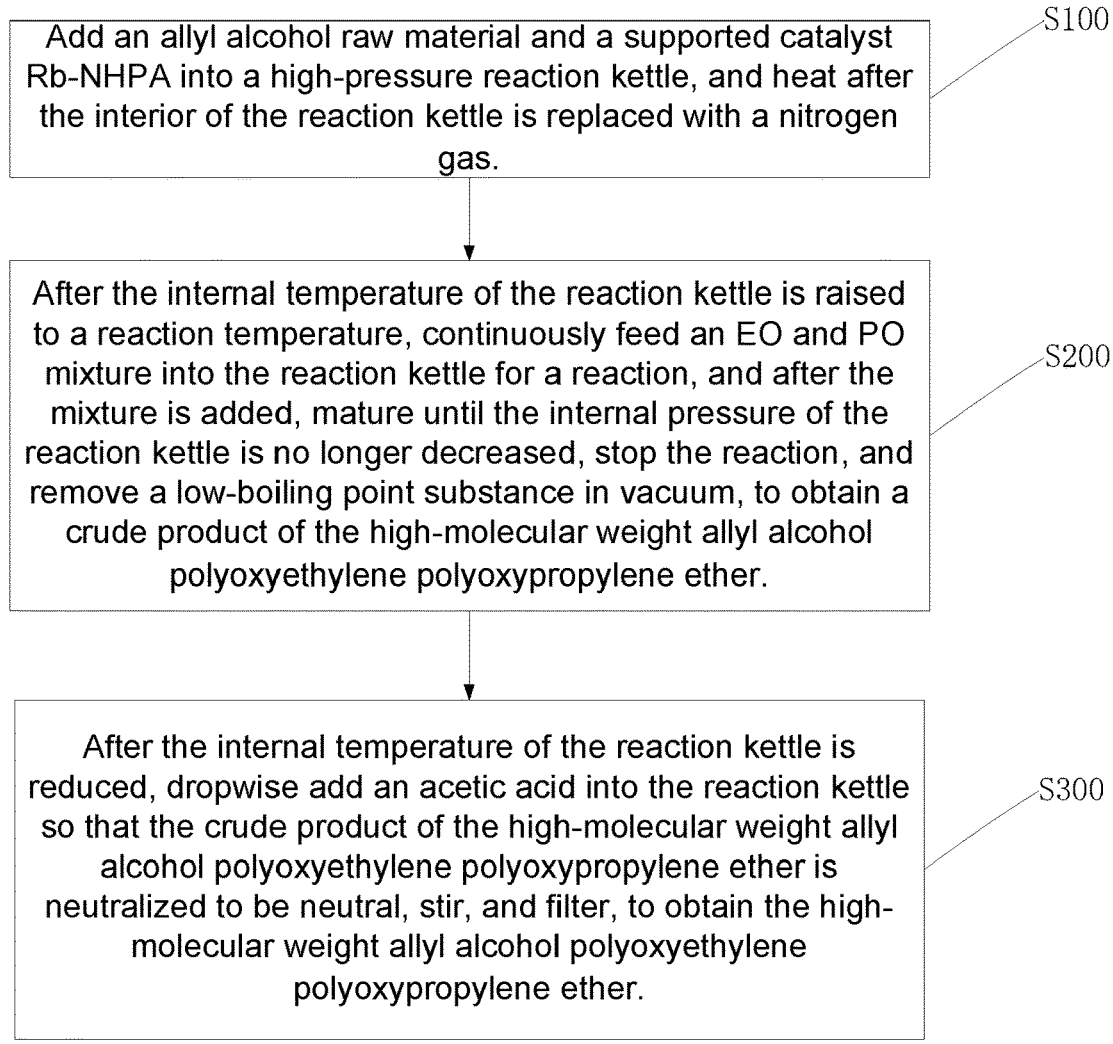
FIG. 1 is a flow schematic diagram of a preparation method for a high-molecular weight allyl alcohol polyoxyethylene polyoxypropylene ether of the present invention.

Referring to FIG. 1, the present invention provides a preparation method for a high-molecular weight allyl alcohol polyoxyethylene polyoxypropylene ether, including the following steps.

Step S100, an allyl alcohol raw material and a supported catalyst Rb-NHPA are added into a high-pressure reaction kettle, and it is heated after the interior of the reaction kettle is replaced with a nitrogen gas; and herein, the amount of the supported catalyst Rb-NHPA is 0.05%~0.5% of the mass of the high-molecular weight allyl alcohol polyoxyethylene polyoxypropylene ether obtained finally.

Figure 2:
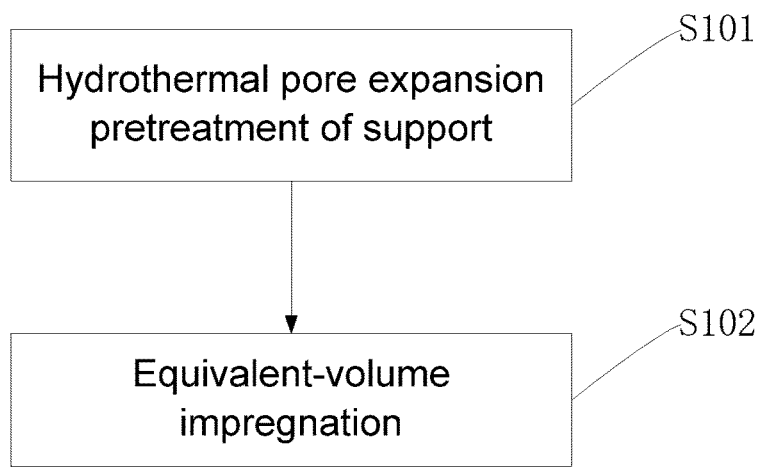
FIG. 2 is a preparation flow schematic diagram of a supported catalyst Rb-NHPA in the preparation method for the high-molecular weight allyl alcohol polyoxyethylene polyoxypropylene ether of the present invention.

The supported catalyst Rb-NHPA is a porous honeycomb solid catalyst formed by using NHPA as a support and supporting alkali metal rubidium (Rb), and the specific preparation steps are shown in FIG. 2, including:

Step S101, hydrothermal pore expansion pretreatment of support: the NHPA support is put into the reaction kettle, deionized water is added, and water vapor pore expansion treatment of the NHPA support is performed under a condition of gas protection, and after vacuum-drying is performed and the water is removed, it is roasted, cooled, and vacuumized. It is specifically as follows: under the conditions of 120° C. of the temperature, 1.2 Mpa of the pressure, and using $N_2$ as a protective gas, after the water vapor pore expansion treatment is performed on the NHPA support for 2 h, it is put into a 110° C. vacuum drying oven and dried for 6 h, to remove the water, then it is roasted in a 600° C. muffle furnace for 4 h, and vacuumized for 30 min after being cooled to a room temperature.

Step S102, equivalent-volume impregnation: the NHPA support after the hydrothermal pore expansion pretreatment is dissolved in anhydrous ethanol, rubidium hydroxide solution is added and stirred intensely (preferably it is stirred intensely at 60° C.~80° C. for 6-8 hours), so that the NHPA support is fully contacted with an active component, then it is filtered after intermittent ultrasonic assisted impregnation (preferably the intermittent ultrasonic assisted impregnation is performed for two times), and vacuum-dried, to form a porous honeycomb solid, and it is roasted (preferably it is roasted at 600° C. for 3 hours), to obtain the supported catalyst Rb-NHPA.

Step S200, after the internal temperature of the reaction kettle is raised to a reaction temperature, an EO and PO mixture is continuously fed into the reaction kettle for a reaction, and after the mixture is added, it is matured until the internal pressure of the reaction kettle is no longer decreased, the reaction is stopped, and a low-boiling point substance (the low-boiling point substance is an incompletely reacted EO and PO mixture and an aldehyde low-boiling point substance generated by a side reaction) is removed in vacuum, to obtain a crude product of the high-molecular weight allyl alcohol polyoxyethylene polyoxypropylene ether; and herein, the weight ratio of EO to PO is 1:0.5~5, and the molecular weight of the obtained crude product of the high-molecular weight allyl alcohol polyoxyethylene polyoxypropylene ether is 3000~8000.

Step S300, after the internal temperature of the reaction kettle is reduced, an acetic acid is dropwise added into the reaction kettle so that the crude product of the high-molecular weight allyl alcohol polyoxyethylene polyoxypropylene ether is neutralized to be neutral, and it is stirred, and filtered, to obtain the high-molecular weight allyl alcohol polyoxyethylene polyoxypropylene ether.

The reaction mechanism of the preparation method is as follows.

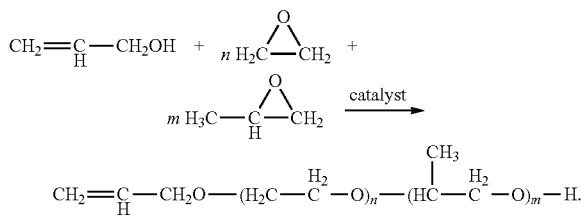

Compared with the existing technology, the preparation method of the present invention uses the supported catalyst Rb-NHPA with high activity, so that the reaction is more complete and more sufficient. Under the condition of the same molecular weight, the double bond retention rate is high, the distribution coefficient is small, the reaction time is shorter, and the by-product content is low, so the refining process of the polyether is omitted, and the process time is greatly saved. In addition, the supported catalyst Rb-NHPA may be recycled, reused, and environment-friendly, and the cost may also be reduced.

The high-molecular weight allyl alcohol polyoxyethylene polyoxypropylene ether and the preparation method of the present invention are further described below by embodiments and contrast examples.

Embodiment 1

In Embodiment 1, a high-molecular weight allyl alcohol polyoxyethylene polyoxypropylene ether is specifically prepared by using the following steps.

S1: 33.1 g of anhydrous allyl alcohol and 9.15 g of a supported catalyst Rb-NHPA are added into a reaction kettle, and it is heated after the interior of the reaction kettle is replaced with a nitrogen gas.

S2: while the temperature is raised to about 80-85° C., 1082 g of EO and 885 g of PO are simultaneously fed into the reaction kettle, and after EO and PO are added, feeding is stopped, it is matured for a certain time, and while the pressure is no longer decreased, it is vacuum-degassed, and cooled.

S3: while the reaction temperature is reduced to about 50° C., 6.4 g of an acetic acid is dropwise added into the reaction kettle, and it is filtered after being stirred for 30 min, and discharged, to obtain the high-molecular weight allyl alcohol polyoxyethylene polyoxypropylene ether, and the supported catalyst Rb-NHPA is recovered.

A difference between Embodiments 2-5 and Embodiment 1 is only that the masses of the allyl alcohol, the supported catalyst Rb-NHPA, EO and PO are different, and it is specifically shown in Table 1 below.

TABLE 1

| Embodiment | Allyl alcohol | Rb-NHPA | EO | PO | Acetic acid |
|---|---|---|---|---|---|
| 1 | 33.1 | 9.15 | 1082 | 885 | 6.4 |

TABLE 1-continued

| Embodiment | Allyl alcohol | Rb-NHPA | EO | PO | Acetic acid |
|---|---|---|---|---|---|
| 2 | 25.8 | 9.15 | 1086 | 888 | 6.4 |
| 3 | 21.1 | 9.15 | 1088 | 878 | 6.4 |
| 4 | 17.8 | 9.15 | 1090 | 876 | 6.4 |
| 5 | 15.4 | 9.15 | 1092 | 874 | 6.4 |

Contrast Example 1

A high-molecular weight allyl alcohol polyoxyethylene polyoxypropylene ether is prepared by an existing technology, and a specific process is as follows.

S1: 96.6 g of anhydrous allyl alcohol and 4.5 g of a potassium hydroxide are added into a reaction kettle, and it is heated after the interior of the reaction kettle is replaced with $N_2$.

S2: while the temperature is raised to 80-85° C., 772 g of EO and 631 g of PO are simultaneously fed into the reaction kettle, and after EO and PO are added, feeding is stopped, it is matured for a certain time, and while the pressure is no longer decreased, it is vacuum-degassed, cooled, and discharged, to obtain an intermediate allyl alcohol random polyether 900.

S3: after the reaction kettle is cleaned and dried, 514 g of the intermediate allyl alcohol random polyether 900 and 4.5 g of the potassium hydroxide (KOH) are added into the reaction kettle, and the temperature is raised after the interior of the reaction kettle is replaced with $N_2$.

S4: after the temperature is raised to 105-115° C., it is dehydrated for 1 h, and after that, 817 g of EO and 669 g of PO are continuously fed into the reaction kettle, after EO and PO are added, it is matured for a certain time, and while the pressure in the reaction is no longer decreased, it is degassed, and cooled below 50° C.

S5: 140 g of deionized water and 10.5 g of a phosphoric acid are added into the reaction kettle, it is stirred for 15 min, 30.0 g of a polyether adsorbent aluminum silicate is added, it is continuously stirred for 30 min, then the temperature is raised to 80-85° C. and it is vacuum-dehydrated, and after dehydration, the temperature is continuously raised to 110-120° C. and kept for 1 h, after that, it is cooled, and filtered, to obtain the high-molecular weight allyl alcohol polyoxyethylene polyoxypropylene ether.

A difference between Contrast examples 2-5 and Contrast example 1 is only that the masses of the allyl alcohol random polyether 900, KOH, EO and PO are different, and it is specifically shown in Table 2 below.

TABLE 2

| Contrast example | Allyl alcohol random polyether 900 | KOH | EO | PO | Deionized water | Phosphoric acid | Aluminum silicate |
|---|---|---|---|---|---|---|---|
| 1 | 514 | 4.5 | 817 | 669 | 140 | 10.5 | 30.0 |
| 2 | 400 | 4.8 | 880 | 720 | 140 | 10.5 | 30.0 |
| 3 | 327 | 5.0 | 920 | 753 | 140 | 10.5 | 30.0 |
| 4 | 276 | 5.2 | 948 | 776 | 140 | 10.5 | 30.0 |
| 5 | 240 | 5.3 | 968 | 792 | 1400 | 10.5 | 30.0 |

The high-molecular weight allyl alcohol polyoxyethylene polyoxypropylene ethers prepared in Embodiments 1-5 and Contrast examples 1-5 are characterized, and a testing method is as follows.

Hydroxyl value: determined according to a phthalic anhydride method in GB/T 7383-2007.

Iodine value: determined according to GB/T 13892-2012.

The double bond retention rate is calculated according to the following formula, I=(M hydroxyl value/M iodine value)*100%, herein I is the double bond retention rate, M hydroxyl value is the molecular weight calculated by the hydroxyl value, and M iodine value is the molecular weight calculated by the iodine value.

A gel permeation chromatography (GPC) uses a chromatographic pure tetrahydrofuran as a mobile phase, the preparation concentration is 0.01 g/mL, and the test temperature is 40° C.

Test results are shown in Table 3 below.

TABLE 3

| | Hydroxyl value (mgKOH/g) | Iodine value (gI$_2$/ 100 g) | Double bond retention rate (/%) | Number average molecular weight | Molecular weight distribution coefficient |
|---|---|---|---|---|---|
| Embodiment 1 | 16.5 | 7.6 | 97.9 | 3378 | 1.05 |
| Contrast example 1 | 17.5 | 7.8 | 96.1 | 3226 | 1.07 |
| Embodiment 2 | 13.6 | 6.0 | 97.3 | 4297 | 1.06 |
| Contrast example 2 | 14.1 | 6.2 | 95.9 | 4101 | 1.09 |
| Embodiment 3 | 11.2 | 4.9 | 96.2 | 5205 | 1.07 |
| Contrast example 3 | 12.1 | 5.2 | 94.3 | 4880 | 1.11 |
| Embodiment 4 | 9.5 | 4.1 | 95.7 | 6134 | 1.09 |
| Contrast example 4 | 10.4 | 4.5 | 93.7 | 5625 | 1.16 |
| Embodiment 5 | 8.4 | 3.6 | 95.1 | 7054 | 1.10 |
| Contrast example 5 | 9.4 | 4.0 | 92.5 | 6362 | 1.18 |

It may be seen from the experimental results that while the molecular weight design of the high-molecular weight allyl alcohol polyoxyethylene polyoxypropylene ether prepared by the method provided by the present invention is the same, the double bond retention rate is high and the distribution coefficient is small, this is because the supported catalyst Rb-NHPA has the higher catalytic activity, the reaction is more complete relatively, the reaction time is shorter, and the by-product content is low; compared with the existing process, the supported catalyst may be recycled and reused; and because the post-treatment process is not required, the process time is greatly saved, and the waste adsorbent does not need to be treated, it is environment-friendly.

The above implementation modes are only preferred implementation modes of the present invention, and may not be used to limit a scope of protection of the present invention. Any non-substantial changes and replacements made by those skilled in the art on the basis of the present invention belong to the scope of protection claimed by the present invention.

What is claimed is:

1. A preparation method for an allyl alcohol polyoxyethylene polyoxypropylene ether, comprising:

S1, adding an allyl alcohol raw material and a supported catalyst Rb-supported nano-hydroxyapatite (Rb-NHPA) into a first reaction kettle, and heating after an interior of the first reaction kettle is replaced with nitrogen gas;

S2, after an internal temperature of the first reaction kettle is raised to a reaction temperature, continuously feeding a mixture of ethylene oxide (EO) and propylene oxide (PO) for reaction, and after the mixture is added, performing reaction until an internal pressure of the first reaction kettle is no longer decreased, stopping the reaction, and removing unreacted EO and PO and aldehyde by-product in vacuum, to obtain a crude product of the allyl alcohol polyoxyethylene polyoxypropylene ether; and S3, after the internal temperature of the first reaction kettle is reduced, dropwise adding an acetic acid into the first reaction kettle so that the crude product of the allyl alcohol polyoxyethylene polyoxypropylene ether is neutralized to be neutral, stirring, and filtering, to obtain the allyl alcohol polyoxyethylene polyoxypropylene ether.

2. The preparation method according to claim 1, wherein in S2, the reaction is performed according to the following equation:

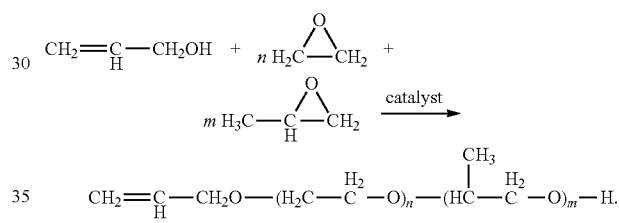

3. The preparation method according to claim 1, wherein the supported catalyst Rb-NHPA in step S1 is prepared by the following steps:

S1-1, hydrothermal pore expansion pretreatment of support: putting a nano-hydroxyapatite (NHPA) support into a second reaction kettle, adding deionized water thereto, and performing water vapor pore expansion treatment of the NHPA support under a condition of gas protection, and after vacuum-drying and removing the water, roasting, cooling, and vacuumizing; and S1-2, equivalent-volume impregnation: dissolving the NHPA support after the hydrothermal pore expansion pretreatment in anhydrous ethanol, adding a rubidium hydroxide solution thereto and stirring, so that the NHPA support is contacted with the rubidium hydroxide solution, then filtering after intermittent ultrasonic assisted impregnation, vacuum-drying a resulting solid, to form a porous honeycomb solid, and roasting, to obtain the supported catalyst Rb-NHPA.

4. The preparation method according to claim 3, wherein a mass ratio of the NHPA support to the deionized water is 0.5-2:3.

5. The preparation method according to claim 3, wherein a mass ratio of the rubidium hydroxide solution to the anhydrous ethanol is 0.5-5:10.

6. The preparation method according to claim 3, wherein in step S1-1, operations of "performing the water vapor pore expansion treatment of the NHPA support under the condition of gas protection, and after vacuum-drying and removing water, roasting, cooling, and vacuumizing" are specifically as follows: under conditions of a temperature of 120° C. and a pressure of 1.2 Mpa, using $N_2$ as a protective gas, after performing the water vapor pore expansion treatment on the NHPA support for 2 h, putting the NHPA support into a 110° C. vacuum drying oven and drying for 6 h, to remove water, then roasting in a 600° C. muffle furnace for 4 h, and vacuumizing for 30 min after cooling to room temperature.

7. The preparation method according to claim 3, wherein in step S1-2, after the rubidium hydroxide solution is added, a resulting mixture is stirred at a temperature of 60° C.-80° C. for 6-8 hours; and the intermittent ultrasonic assisted impregnation is performed for two times; and after being filtered, the resulting solid is put into a 120° C. vacuum drying oven and dried for 12 h; and after the porous honeycomb solid is formed, the porous honeycomb solid is roasted for at 600° C. for 3 h.

8. The preparation method according to claim 1, wherein an amount of the supported catalyst Rb-NHPA in step S1 is 0.05%-0.5% of a mass of the allyl alcohol polyoxyethylene polyoxypropylene ether obtained finally.

9. The preparation method according to claim 1, wherein the crude product of the allyl alcohol polyoxyethylene polyoxypropylene ether has a molecular weight of 3000-8000, and a weight ratio of EO to PO in step S2 is 1:0.5-5.

10. The preparation method according to claim 1, wherein the reaction in step S2 is performed at a temperature of 80° C.-150° C., and a pressure of 0.09 Mpa to 0.40 Mpa; and in step S3, the internal temperature of the first reaction kettle is reduced to 50° C., and the stirring is performed for 30-60 minutes.

* * * * *